United States Patent
Jung et al.

(10) Patent No.: US 10,889,160 B2
(45) Date of Patent: Jan. 12, 2021

(54) METHOD FOR CONDITIONAL NATURAL VENTILATION OF VEHICLE INTERIOR AND VEHICLE THEREBY

(71) Applicants: HYUNDAI MOTOR COMPANY, Seoul (KR); KIA MOTORS CORPORATION, Seoul (KR)

(72) Inventors: Tae-Hun Jung, Seoul (KR); Eun-Jung Yeo, Suwon-si (KR); Gi-Lyong Jang, Suwon-si (KR); Jeong-Sik Seo, Hwaseong-si (KR); Jae-Yeon Moon, Seoul (KR); In-Uk Ko, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 576 days.

(21) Appl. No.: 15/834,906

(22) Filed: Dec. 7, 2017

(65) Prior Publication Data
US 2018/0297444 A1  Oct. 18, 2018

(30) Foreign Application Priority Data
Apr. 14, 2017  (KR) .......... 10-2017-0048549

(51) Int. Cl.
*B60H 1/00* (2006.01)
*B61D 27/00* (2006.01)
(Continued)

(52) U.S. Cl.
CPC ......... *B60H 1/00764* (2013.01); *B60H 1/008* (2013.01); *B60H 1/00835* (2013.01); *B60H 1/00849* (2013.01)

(58) Field of Classification Search
CPC ............ B60H 1/00764; B60H 1/00835; B60H 1/00849; B60H 1/008; B60H 3/0085
(Continued)

(56) References Cited

U.S. PATENT DOCUMENTS

| 4,089,310 A * | 5/1978 | Noguchi | F02B 1/06 123/443 |
| 6,758,739 B1 * | 7/2004 | Sangwan | B60H 1/008 454/139 |

(Continued)

FOREIGN PATENT DOCUMENTS

KR  2014-0033958 A  3/2014

*Primary Examiner* — Helena Kosanovic
(74) *Attorney, Agent, or Firm* — Morgan, Lewis & Bockius LLP

(57) ABSTRACT

A method for natural ventilation of a vehicle interior includes steps of: determining, by a controller, formation of an interior negative pressure in an interior space while driving of a vehicle is maintained as an internal air mode, determining, by the controller, an over-production of a harmful gas in an exhaust gas using an air-to-fuel ratio or an Accelerator Position Scope (APS), in an air conditioning system; regarding satisfaction of the formation of the interior negative pressure and satisfaction of the over-production of the harmful gas as an entry condition and mixing an exterior air into the interior space so as to mitigate the interior negative pressure in the internal air mode; and after mixing the exterior air, regarding the non-satisfaction of the over-production of the harmful gas as a cancellation condition and blocking the exterior air.

18 Claims, 6 Drawing Sheets

(51) Int. Cl.
*B63J 2/00* (2006.01)
*B64D 13/00* (2006.01)

(58) Field of Classification Search
USPC .......................................................... 454/75
See application file for complete search history.

(56) References Cited

U.S. PATENT DOCUMENTS

| | | | | |
|---|---|---|---|---|
| 8,092,285 | B2* | 1/2012 | Mathur | B60H 3/0085 |
| | | | | 454/75 |
| 8,393,140 | B2* | 3/2013 | Perry | B01D 53/9477 |
| | | | | 60/285 |
| 8,594,910 | B2* | 11/2013 | Seo | B60H 1/00849 |
| | | | | 701/108 |
| 9,284,909 | B2* | 3/2016 | Wooldridge | F02D 41/0072 |

\* cited by examiner

METHOD FOR CONDITIONAL NATURAL VENTILATION OF VEHICLE INTERIOR AND VEHICLE THEREBY

CROSS-REFERENCE TO RELATED APPLICATION

This application claims the benefit of priority to Korean Patent Application No. 10-2017-0048549, filed on Apr. 14, 2017 in the Korean Intellectual Property Office, the entirety of which is incorporated herein by reference.

TECHNICAL FIELD

The present disclosure relates to a method for blocking an introduction of an exhaust gas into a vehicle interior, and more particularly, to a method for a conditional natural ventilation of vehicle interior capable of securing a passenger safety from an introduction of CO, HC, $NO_x$, and $H_2S$ in an exhaust gas into an interior and resolving side effects due to an introduction of an exterior air, thus enhancing an interior comfort and resolving client's dissatisfaction.

DESCRIPTION OF RELATED ART

Recently, a measurement of an exhaust gas generated in an internal combustion engine of a vehicle requires blocking of an introduction of the exhaust gas into an interior due to a danger to a human body by CO, HC, $NO_x$, $NH_3$, $H_2S$ and the like in addition to an emission regulation.

The reason is why a vehicle, which is driving at a high speed (more than about 120 Kph), forms an interior negative pressure due to a pressure difference between interior/exterior of the vehicle by an aerodynamic property; and the interior negative pressure introduces an exhaust gas, which is emitted to an exhaust system component of the vehicle while containing CO, HC, $NO_x$, $H_2S$ and the like, together with smell, into an interior and thus jeopardizes passenger safety due to the presence of CO.

Accordingly, an example of the measurement of blocking the introduction of the exhaust gas into the interior is a method for natural ventilation of a vehicle interior. As one example, the method for natural ventilation of the vehicle interior switches from an interior air mode into an exterior air mode when a driving speed of the vehicle reaches a certain speed (e.g., more than about 120 Kph) and a condition of forming the interior negative pressure establishes, thus resolving the condition of forming the interior negative pressure by introducing the exterior air.

As a result, the method for natural ventilation of the vehicle interior may somewhat resolve a structural limitation that does not fundamentally block the introduction of the exhaust gas due to impossibility of a perfect airtightness not to form the interior negative pressure in the vehicle interior compared to a vehicle rear and a structural necessity such as formation of an electroplate hole for drainage of the vehicle rear.

However, the method for natural ventilation of the vehicle interior controls an intake door of an air conditioning system at more than a certain vehicle speed and resolves the condition of forming the interior negative pressure, and thus necessarily causes the following side effects.

Firstly, a frequent logic entry in a driving condition on the road, which reaches a certain vehicle speed, becomes one reason to cause client's dissatisfaction. Secondly, an interior comfort is reduced due to an introduction of an exterior air according to the frequent logic entry. Thirdly, a short-acting cooling is deteriorated due to a mixture of the exterior air of a high temperature/humidity in the summer, and particularly, a cold wind is introduced due to the mixture of the exterior air below zero in the winter. Fourthly, an average compressor duty of a cooling condition is increased due to the increment in a frequency of the mixture of the exterior air in the summer and thus causes deterioration of an air-to-fuel ratio due to the increment in fuel consumption. Fifthly, the logic entry is performed at a certain speed and thus may not properly reflect the characteristics of a diesel engine and a gasoline engine that the time or the degree of the harmful gas is different.

SUMMARY

Other objects and advantages of the present disclosure can be understood by the following description, and become apparent with reference to the embodiments of the present disclosure. Also, it is obvious to those skilled in the art to which the present disclosure pertains that the objects and advantages of the present disclosure can be realized by the means as claimed and combinations thereof.

Accordingly, the object of the present disclosure considering the above points is to provide a method for a conditional natural ventilation of a vehicle interior and a vehicle thereby capable of regarding an emission time of CO, HC, $NO_x$, $NH_3$, and $H_2S$ as entry and cancellation conditions and performing a logic linked with a vehicle speed at the time of forming the interior negative pressure, thus enhancing a passenger safety by effectively restraining the introduction of CO, HC, $NO_x$, $NH_3$, and $H_2S$ into an interior and enhancing cost competitiveness by reducing or removing a component additionally applied; particularly, resolving client's dissatisfaction due to a frequent logic entry causing side effects in a high speed driving, enhancing an interior comfort, and improving an air-to-fuel ratio.

A method for a conditional natural ventilation of a vehicle interior according to the present disclosure comprises steps of: determining, by a controller, formation of an interior negative pressure in an interior space while driving of a vehicle is maintained as an internal air mode, determining, by the controller, an over-production of a harmful gas in an exhaust gas using an air-to-fuel ratio or an Accelerator Position Scope (APS), when an air conditioning system is in operation; regarding satisfaction of the formation of the interior negative pressure and satisfaction of the over-production of the harmful gas as an entry condition and mixing an exterior air into the interior space so as to mitigate the interior negative pressure in the internal air mode; and after mixing the exterior air, regarding the non-satisfaction of the 10 over-production of the harmful gas as a cancellation condition and blocking the exterior air.

As an exemplary embodiment, the exterior air is introduced into a door of the air conditioning system and the door opens only a partial area of total opening area.

As an exemplary embodiment, the determining formation of the interior negative pressure regards a vehicle speed as the condition of forming the interior negative pressure; the vehicle speed is classified into satisfaction and non-satisfaction of the condition of forming the interior negative pressure; and the vehicle speed upon satisfaction is set to be higher than upon the non-satisfaction.

As an exemplary embodiment, the harmful gas, which is overly produced regarding each of the air-to-fuel ratio and the APS as the condition of the over-production of the harmful gas, is CO; the air-to-fuel ratio and the APS are classified into satisfaction and non-satisfaction of the condition of the over-production of the harmful gas; and the air-to-fuel ratio upon the satisfaction is set to be lower than upon the non-satisfaction and the APS upon the satisfaction is set to be higher than upon the non-satisfaction. The blocking of the exterior air according to the non-satisfaction of the condition of the over-production of the harmful gas is time-delayed by a timer count after the non-satisfaction.

As an exemplary embodiment, the condition of the over-production of the harmful gas further comprises a catalyst temperature, a cooling water temperature, an LNT front end temperature, a DPF regeneration, an EGR Duty, and a SCR front end temperature; the catalyst temperature or the cooling water temperature regards HC as the overly produced harmful gas, the LNT front end temperature or the DPF regeneration or the EGR Duty regards $NO_x$ as the overly produced harmful gas, and the SCR front end temperature regards $NH_3$ as the overly produced harmful gas.

As an exemplary embodiment, the catalyst temperature and the cooling water temperature are classified into satisfaction and non-satisfaction of the condition of the over-production of the harmful gas; the catalyst temperature upon the satisfaction is set to be lower than upon the non-satisfaction and the cooling water temperature upon the satisfaction is set to be lower than upon the non-satisfaction; and the blocking of the exterior air according to the non-satisfaction of the condition of the over-production of the harmful gas performs without a time delay after the non-satisfaction.

As an exemplary embodiment, the LNT front end temperature, the DPF regeneration, and the EGR Duty are classified into satisfaction and non-satisfaction of the condition of the over-production of the harmful gas; the LNT front end temperature upon the satisfaction is set to be lower than upon the non-satisfaction; the DPF regeneration upon the satisfaction is set to be in operation while it is set to be stopped upon non-satisfaction; and the EGR Duty upon the satisfaction is set to be lower than upon the non-satisfaction; and the blocking of the exterior air according to the non-satisfaction of the condition of the over-production of the harmful gas performs without a time delay after the non-satisfaction.

As an exemplary embodiment, the SCR front end temperature is classified into satisfaction and non-satisfaction of the condition of the over-production of the harmful gas, the SCR front end temperature upon the satisfaction is set to be higher than upon the non-satisfaction; and the blocking of the exterior air according to the non-satisfaction of the condition of the over-production of the harmful gas performs without a time delay after the non-satisfaction.

As an exemplary embodiment, (a-1) before the formation of the interior negative pressure and the determination of the over-production of the harmful gas in the exhaust gas, checking, using an emission data of the exhaust gas, a TPS and a vehicle speed together with an air-to-fuel ratio, an APS, a catalyst temperature, a cooling water temperature, an LNT front end temperature, a DPF regeneration, an EGR Duty, and a SCR front end temperature; and (a-2) determining whether or not an operation status of the air conditioning system is in the internal air mode are performed. The air-to-fuel ratio, the APS, the catalyst temperature, the cooling water temperature, the LNT front end temperature, the DPF regeneration, the EGR Duty, and the SCR front end temperature are classified as a production factor of the harmful gas.

And, a vehicle according to the present disclosure for achieving the above object comprises a controller configured to introduce an exterior air into an interior space in a condition of the formation of an interior negative pressure and a condition of a production of a harmful gas in an exhaust gas, and mitigating the condition of the formation of the interior negative pressure; an air conditioning system configured to operate in an internal air mode or an exterior air mode and configured to introduce exterior air into the interior space by opening of a door; and an exhaust line flowing the exhaust gas generated in an engine with an EGR gas supplied by the EGR and comprising a catalyst removing the harmful gas and a post-processing device.

As an exemplary embodiment, the door introduces the exterior air by a 3% of total opening area.

As an exemplary embodiment, the controller comprises an EMS controlling the engine and an air conditioning controller having a natural ventilation map with respect to an opening area of the door and controlling the air conditioning system and the door.

As an exemplary embodiment, the catalyst is a WCC or an UCC and the post-processing device is configured as an LNT, a DPF, and a SCR.

The vehicle according to the present disclosure performs a logic of natural ventilation of the vehicle interior linked to conditions of entry and cancellation in addition to a speed sensitivity, thus achieving the following advantages and effects.

Firstly, in an effect aspect of reducing an introduction of an exhaust gas, it is possible to effectively restrain an introduction of CO, HC, NOx, NH3, and $H_2S$ in the exhaust gas into the interior, thus enhancing a passenger safety from CO.

Secondly, in an aspect of an engine property, it is possible to perform the introduction of the exterior air at the exact emission time of CO, HC NOx, NH3, and $H_2S$, thus optimizing blocking of the introduction of the exhaust gas with respect to the gasoline engine and the diesel engine that the emission time and degree of the harmful gas are different.

Thirdly, in an aspect of improving an air conditioning comfort, it is possible to reduce a frequency of introducing the exterior air for preventing the formation of the interior negative pressure according to a high speed driving and to reduce side effects due to a mixture of the exterior air of a high temperature/humidity in the summer and an introduction of the external cold air in the winter, thus improving comfort of an interior air-conditioning and resolving client's dissatisfaction.

Fourthly, in an aspect of improving an air conditioning energy consumption, it is possible to prevent the increment in the average compressor duty of a cooling condition by reducing a frequency of the mixture of the exterior air, thus improving an air-to-fuel ratio by the reduction of a fuel consumption; and particularly, not to perform the logic entry in a severe driving condition, such as rain, on the road, thus maintaining an air conditioning energy consumption of substantially the same condition as that of not applying the logic.

Fifthly, in an aspect of a vehicle design, it is possible to obtain watertightness and satisfy blocking of the introduction of the exhaust gas using an electroplating hole plug and the logic of a mixture of a partial exterior air, thus easily applying even in the conflict condition of the vehicle; and particularly, to improve deterioration of the introduction of the exhaust gas due to degradation of a rubber such as a weather strip and the like, thus developing robustness of the introduction of the exhaust gas and improving durability.

Sixthly, in a cost aspect, it is possible to remove a plurality of electroplating hole drain plug, which is structurally applied in a top-down exhaust system component-applied vehicle or the vehicle with an exhaust gas less then 1 ppm introduced, by applying an exterior air-introduced logic, thus achieving cost savings of the vehicle that the probability of the introduction of the exhaust gas is low.

DESCRIPTION OF SPECIFIC EMBODIMENTS

Reference should be made to the accompanying drawings that illustrate preferred embodiments of the present disclosure, and to the description in the accompanying drawings in order to fully understand the present disclosure, operational advantages of the present disclosure, and objects attained by practicing the present disclosure.

Figure 1:
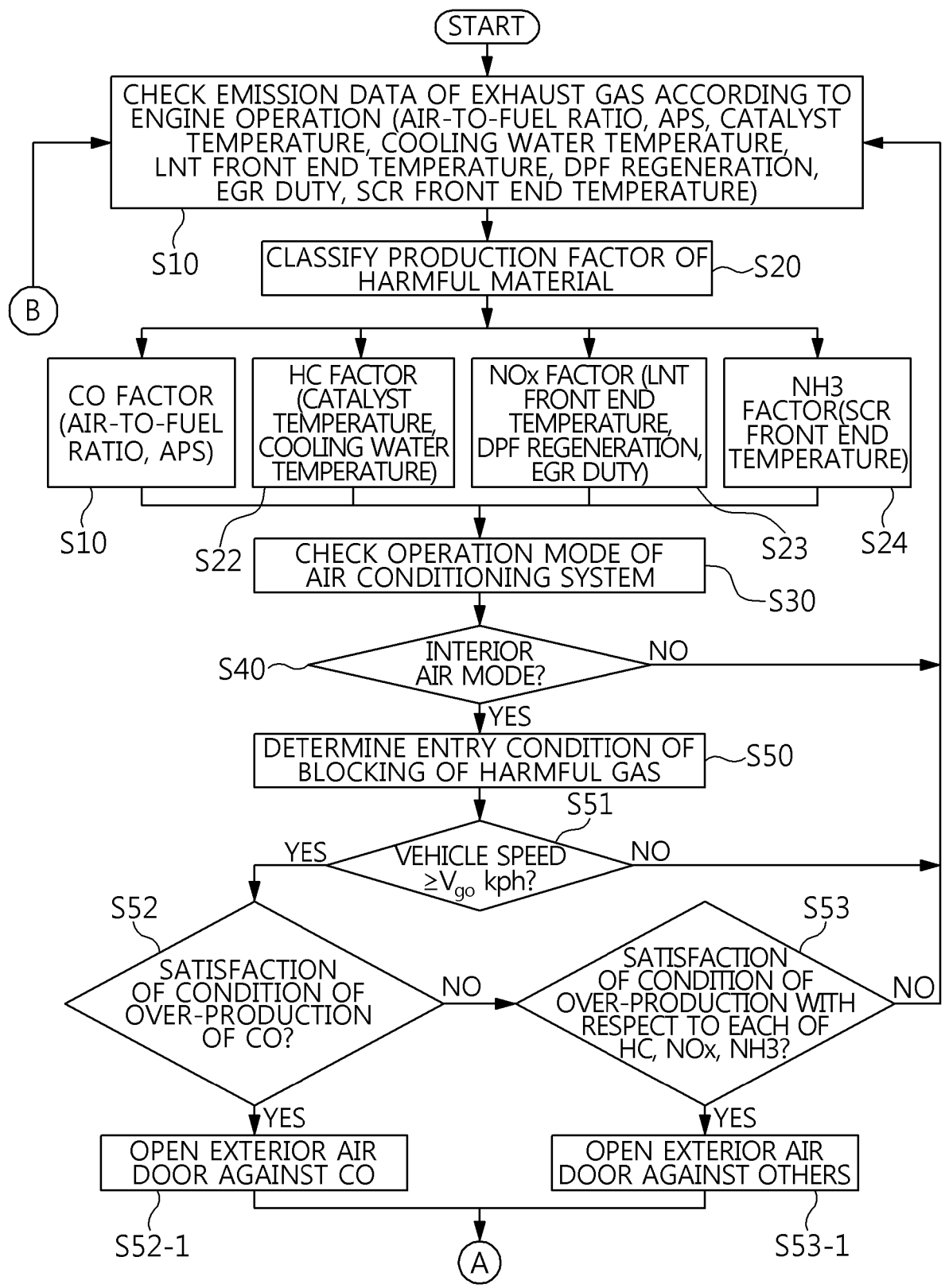
FIGS. 1 and 2 are a flowchart illustrating a method for a conditional, vehicle speed sensitive natural ventilation of a vehicle interior according to an exemplary embodiment of the present disclosure.
Figure 2:
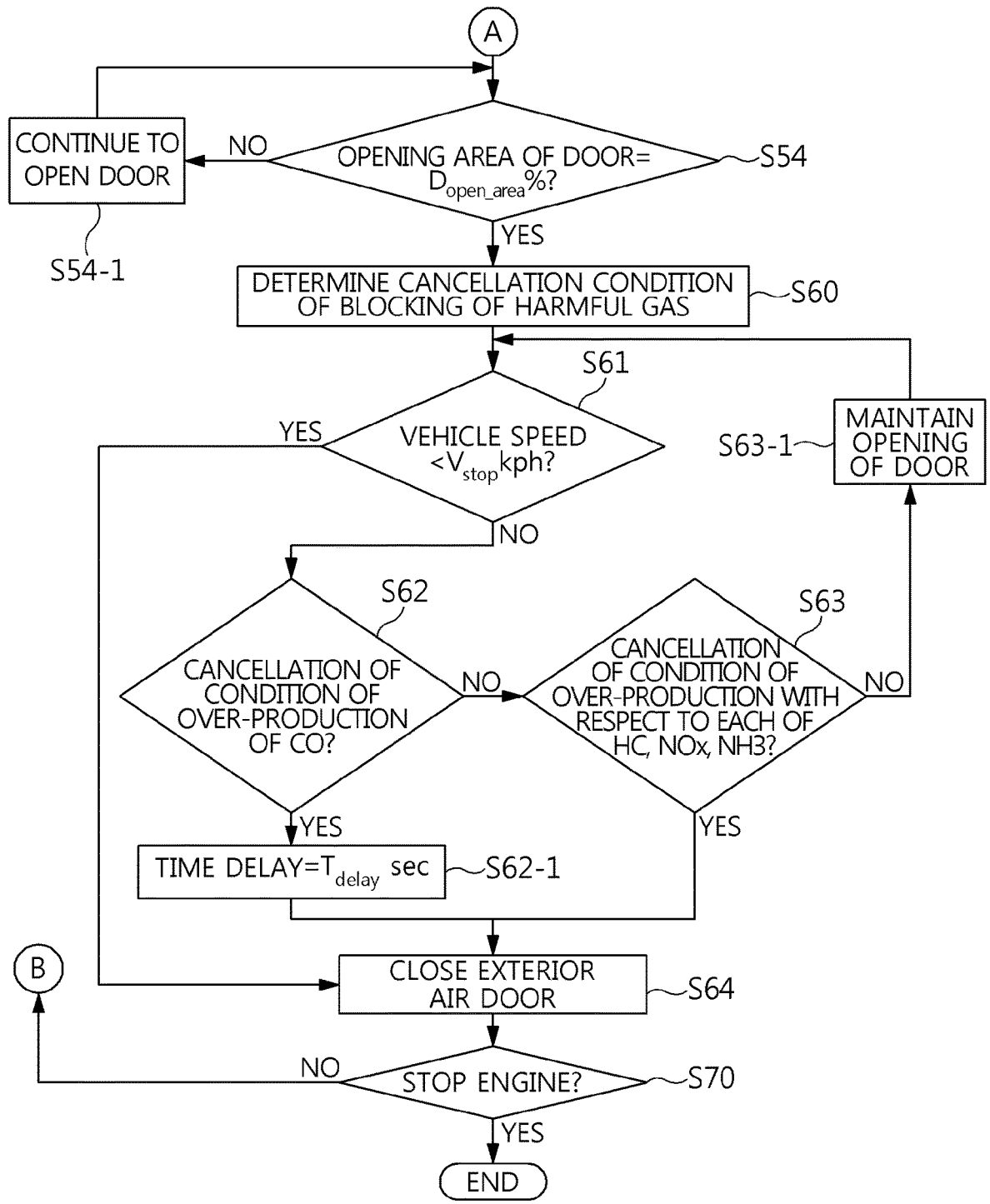

Referring to FIGS. 1 and 2, a method for natural ventilation of a vehicle interior comprises a gas generation mode S10~S40 determining an internal air mode of an air conditioning system while driving a vehicle that an exhaust gas containing harmful materials of CO, HC, $NO_x$, $NH_3$, and $H_2S$ is generated; an excessive gas mode S50~S54 performing natural ventilation by an introduction of an external air without cancelling the internal air mode only when an over-production condition of the harmful material of the exhaust gas is satisfied, while driving the vehicle that generates an interior negative pressure; a normal gas mode S60~S64 stopping natural ventilation by blocking an exterior air when the vehicle during natural ventilation is decelerated and the over-production condition of the harmful material is cancelled. As a result, the method for natural ventilation of the vehicle interior is performed as a conditional, vehicle speed sensitive type, thus resolving side effects resulting from a frequent introduction of the exterior air for blocking the introduction of CO, HC, $NO_x$, $NH_3$, and $H_2S$ at a high speed driving. Particularly, it is possible to apply a priority for removal of CO concentration in the vehicle interior when introducing the exterior air in the excessive gas mode, thus enhancing a passenger safety from the CO.

Figure 3:
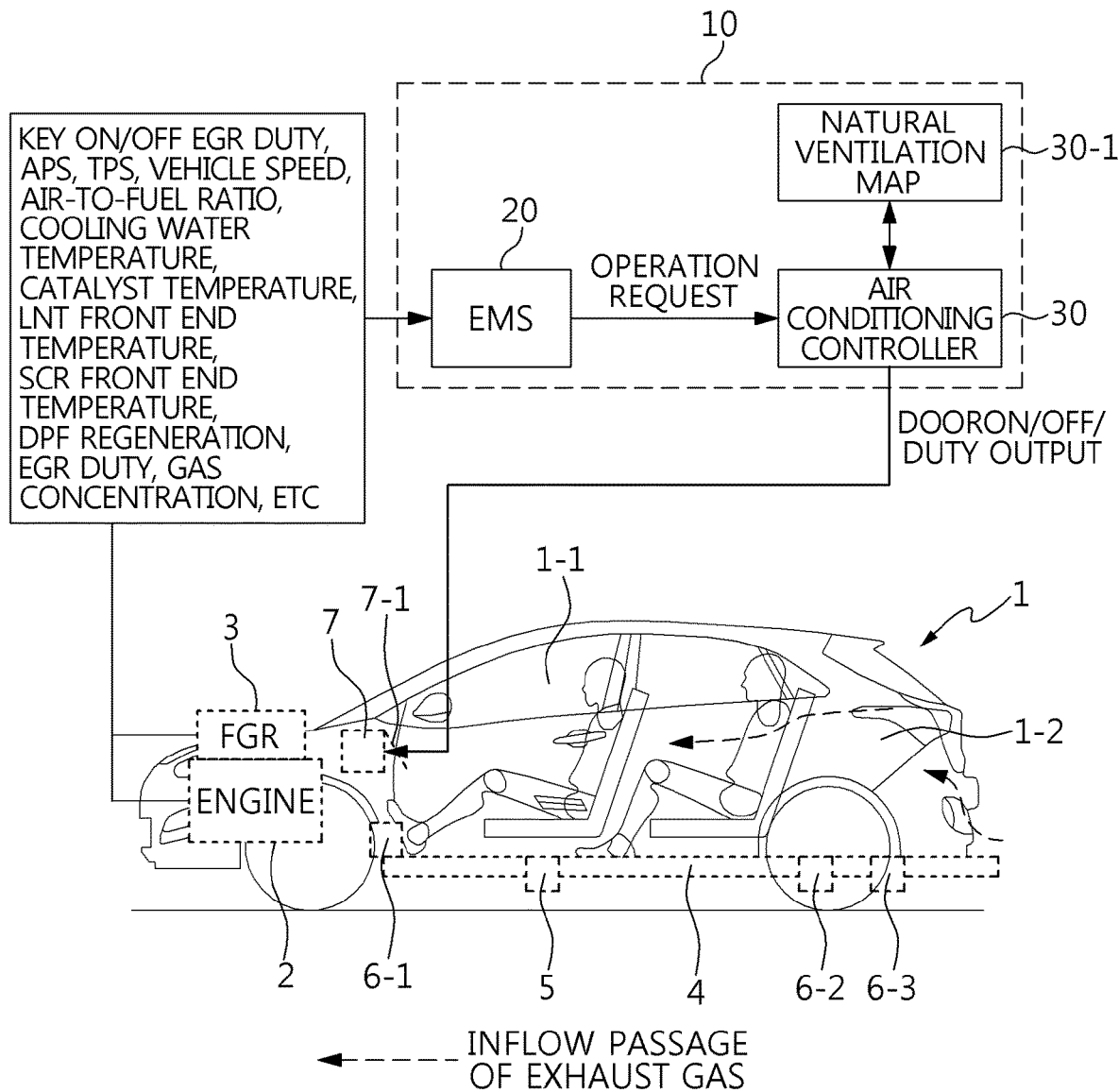
FIG. 3 is a view illustrating one embodiment of a vehicle performing the conditional, vehicle speed sensitive natural ventilation of the vehicle interior according to an exemplary embodiment of the present disclosure.

Referring to FIG. 3, the vehicle 1 forms an interior space 1-1 between an engine room and a trunk room 1-2; an exhaust line 4, which emits an exhaust gas of an engine 2 to the air, is arranged along the bottom of the vehicle body extended from the engine room to the trunk room 1-2; a catalyst 5 purifying and removing CO, HC, $NO_x$, $NH_3$, and $H_2S$ formed as an Emission Material (EM) and Particulate Matters (PM) of the exhaust gas and a post-processing device 6 is configured in the exhaust line 4.

As one example, the engine room comprises an air conditioning system 7 consisting of the engine 2, an Exhaust Gas Recirculation (EGR) 3, and an exterior air door 7-1 opening and closing toward the interior space 1-1; the interior space 1-1 forms front/rear seats and a passenger seat; and the trunk room 1-2 forms an empty space that may be opened and closed by a trunk lid.

As one example, the catalyst 5 removes an EM of the exhaust gas and applies a Warm up Catalytic Converter (WCC) or an Under floor Catalytic Converter (UCC) thereto. The post-processing device 6 comprises an Lean $NO_x$ Trap (LNT) 6-1 absorbing or occluding $NO_x$ of the exhaust gas by a noble metal coating of Ba or K; a Diesel Particulate Filter (DPF) 6-2 burning soot collected inside and removing a PM of the exhaust gas; and a Selective Catalytic Reduction (SCR) 6-3 removing NOx and NH3 of the exhaust gas through a reducing process. In a layout, the catalyst 5, the DPF 6-2, and the SCR 6-3 are arranged toward a rear side of the vehicle 1 along the exhaust line 4 with the LNT 6-1 positioned at a rear end of an exhaust manifold of the engine 2; and detection of an operation status is performed together with a temperature sensor for detecting each temperature.

As one example, the EGR 3 emits an EGR gas to an intake manifold of the engine 2 using the emitted exhaust gas; the air-conditioning system 7 performs opening/closing of the door 7-1 by a motor or an actuator controlled by the controller 10, thus performing air-conditioning for the interior space 1-1; and may be a Heater Ventilated Air Conditioning (HVAC) having a heater function.

As one example, the controller 10 comprises an Engine Management System (EMS) 20; an air-conditioning controller 30; and a natural ventilation map 30-1; and a Controller Area Network or a Control Area Network (CAN) communication is performed therebetween.

The EMS 20 regards a value of each control element according to an operation of the engines 2 and a production of the exhaust gas as an input data and determines formation of an interior negative pressure in the interior space 1-1; and transmits an instruction of the introduction of the exterior air to the air-conditioning controller 30 by a CAN signal so as to block the formation of the interior negative pressure. In this case, the input data comprises a Key ON/OFF signal which indicates operation/stop of the engine 2; an EGR Duty of the EGR 3 with respect to the EGR gas supply of the engine 2; an Accelerator Position Scope (APS) with respect to a pressure amount of an acceleration pedal; a Throttle Position Scope (TPS) with respect to the opening amount of a throttle valve; a vehicle speed of the vehicle 1; an air-to-fuel ratio of the engine 2 measured by an oxygen sensor; a cooling water temperature 1; a catalyst temperature of the catalyst 3, an LNT front end temperature of the LNT 6-1, and a SCR front end temperature of the SCR 6-3 that the exhaust gas passes through; a DPF regeneration operation of the DPF 6-2; a gas concentration of the exhaust gas detected by a sensor and the like.

The air conditioning controller 30 controls the air conditioning system 7 using the internal air mode and the exterior air mode together with the ON/OFF operation of the door 7-1; and particularly, controls an area of a partial introduction of the exterior air of the door 7-1 using a door DUTY output according to an instruction of the introduction of the exterior air of the controller 10. In this case, the area of the partial introduction of the exterior air is set as about 2~5% regarding total opening area as 100%. The natural ventilation map 30-1 comprises a plurality of diagrams that the door DUTY output value according to an opening area of the door 7-1 is matched; and provides the value upon request by the CAN signal of the air conditioning system 7. Particularly, the air conditioning controller 30 and the natural ventilation map 30-1 are integrally configured.

Hereinafter, the method of natural ventilation of the vehicle interior will be described in detail with reference to FIGS. 3 to 6. In this case, a control body comprises the EMS 20, the air conditioning controller 30, and the natural ventilation map 30-1 which performs a CAN communication and constitutes the controller 10 and is generally called a controller 10. A control target is the door 7-1 controlled by a motor or an actuator of the air conditioning system 7.

A control of the natural ventilation of the vehicle interior in the controller 10 is performed by the gas production mode, the excessive gas mode, and the normal gas mode.

First, the gas production mode of the controller 10 comprises checking an emission data of an exhaust gas according to an operation of the engine S10; classifying a production factor of a harmful material S20; checking an operation mode of the air conditioning system S30; and determining an internal air mode S40; and production of the exhaust gas of the driving vehicle and an operation status of the internal air mode of the air conditioning system are confirmed from the gas production mode.

Referring to FIG. 3, the EMS 20 checks, by the emission data of the exhaust gas according to the operation of the engine in the S10, a vehicle speed, an air-to-fuel ratio, a cooling water temperature, an EGR Duty, an APS, a TPS, a vehicle speed of the vehicle 1, a gas concentration, a catalyst temperature, an LNT front end temperature, a DPF regeneration, a SCR front end temperature and the like; and classifying, by the production factor of the harmful material in the S20, an air-to-fuel ratio, an APS, a catalyst temperature, a cooling water temperature, an LNT front end temperature, a DPF regeneration, an EGR Duty, and a SCR front end temperature. As one example, the classifying of the production factor of the harmful material is classified into a CO factor using the air-to-fuel ratio and the APS S21; a HC factor using the catalyst temperature and the cooling water temperature S22; a $NO_x$ factor using the LNT front end temperature, the DPF regeneration, and the EGR Duty S23; and a $NH_3$ factor using the SCR front end temperature S24. And, the EMS 20 checks, in the S30, the operation mode of the air conditioning system 7 by the air conditioning controller 30 and the CAN communication; and determines whether or not the operation mode is in an internal air mode. As a result, the EMS 20 feedbacks to the S10 when the air conditioning system 7 is not in the internal air mode and repeats the same step, while it enters into the excessive gas mode when it is in the internal air mode.

Next, the excessive gas mode of the controller 10 comprises determining an entry condition of blocking the harmful gas S50; determining a threshold vehicle speed S51; determining satisfaction of the condition of the over-production of CO S52 followed by opening an exterior air door against CO S52-1; determining satisfaction of the conditions of the over-production of HC, $NO_x$, and $NH_3$ S53, respectively followed by determining opening of an exterior air door against others S53-1; and opening the door S54; and natural ventilation is performed, from the excessive gas mode, through an introduction of the exterior air without cancelling the internal air mode after determining formation of the interior negative pressure and satisfaction of the condition of the over-production of the harmful material according to the vehicle driving.

Particularly, the controller 10 preferentially performs blocking of CO rather than blocking of HC, $NO_x$, and $NH_3$; if only CO is considered as necessary, the determination of the entry condition of blocking the harmful gas S50 may be simplified as the S51, S52, the S52-1, and S54. The possibility of changing the logic serves convenience that makes a difference of the production amount of the harmful material easily reflected according to a vehicle model.

Referring to FIG. 3, the EMS 20 determines, in the S51, whether or not the driving of the vehicle 1 is a condition that may form an interior negative pressure in the interior space 1-1. As one example, the condition of forming the interior negative pressure applies a vehicle speed defined as a threshold vehicle speed and is set as the following equation.

Condition of forming the interior negative pressure: vehicle speed≥$V_{go}$ kph

Herein, the "vehicle speed" indicates a threshold vehicle speed detected according to the driving of the vehicle 1; the "$V_{go}$" applies about 120 Kph considering an aerodynamic aspect as the vehicle speed of forming the interior negative pressure, but it is possible to apply a predetermined value considering use of the vehicle 1 and density of the interior space 1-1. The "≥" indicates a sign of inequality representing magnitudes of two values and the "vehicle speed≥$V_{go}$ kph" indicates a value greater than the vehicle speed $V_{go}$ that is set as the detected vehicle speed.

As a result, the EMS 20 feedbacks to the S10 when the threshold vehicle speed, which is detected in the vehicle 1 while now driving, is less than 120 Kph($V_{go}$) and repeats the same step, while it performs the determination of the satisfaction of the condition of the over-production of CO S52 when the threshold vehicle speed is more than 120 Kph ($V_{go}$).

Figure 4:
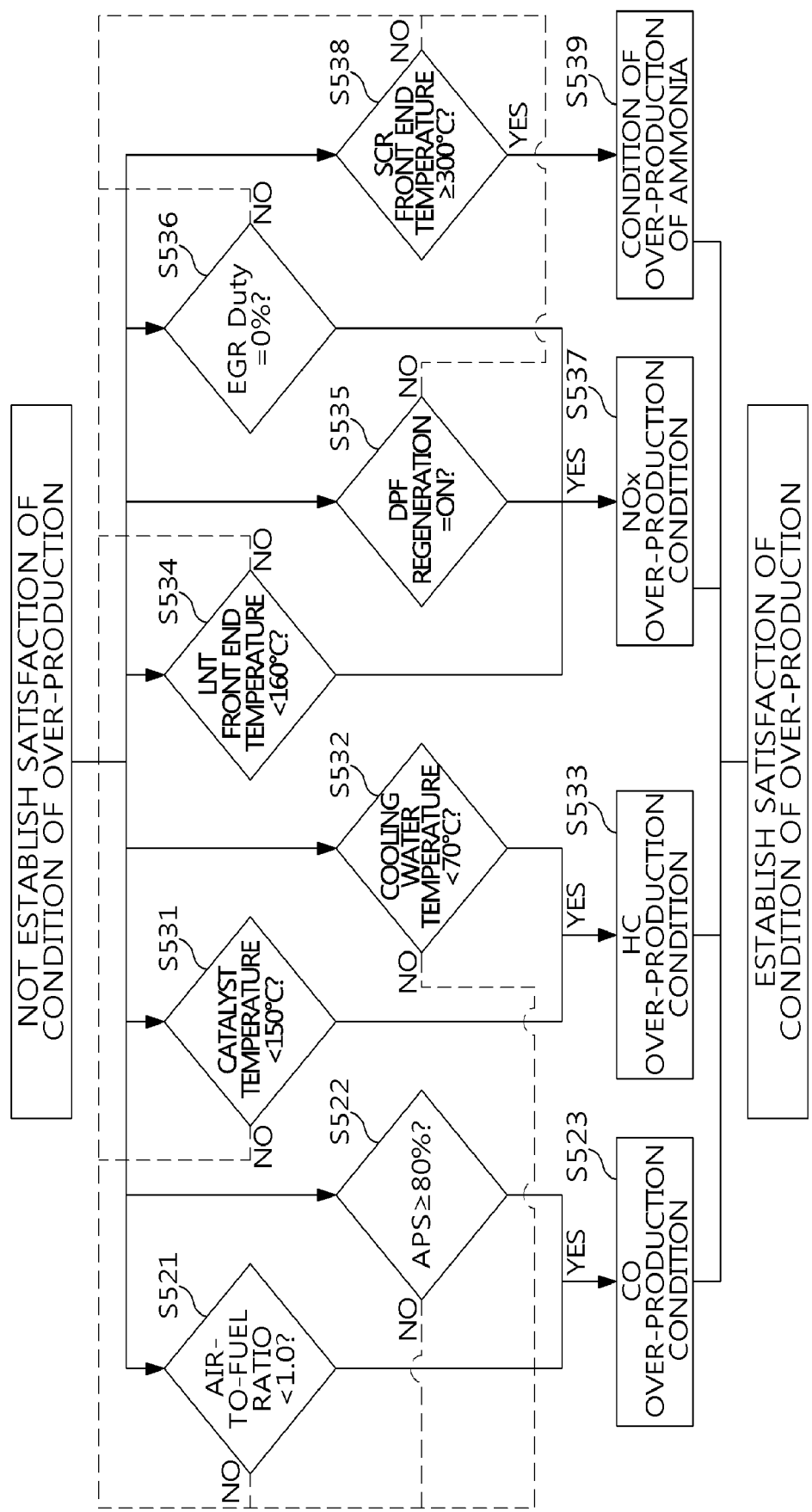
FIG. 4 is a view illustrating a logic of determining an entry condition for blocking of a harmful gas according to an exemplary embodiment of the present disclosure.

Referring to FIG. 4, the EMS 20 applies, in the S52, an air-to-fuel ratio and an APS as a CO factor and performs the determination of the air-to-fuel ratio S521 and the determination of the APS S522, respectively. Accordingly, the determination of the entry condition of the CO factor is set as the following equation.

Equation of the entry condition of the CO factor

Air-to-fuel ratio condition: air-to-fuel ratio<$a$, APS condition: APS≤$b$ %

Herein, the "air-to-fuel ratio" indicates an entry-detected air-to-fuel ratio; the "APS" indicates depression of an entry-detected acceleration pedal; the "b" applies about 80% as an entry-predetermined APS; the "<" indicates a sign of inequality representing magnitudes of two values and the "air-to-fuel ratio <1.0" means that the detected air-to-fuel ratio is less than 1.

As a result, the EMS 20 determining as satisfaction of the condition of the over-production of CO such as S523 when the entry-detected air-to-fuel ratio is less than 1.0 or the entry-detected APS is more than 80%; and enters into the opening of the exterior air door against CO S52-1 controlled by the air conditioning controller 30 when the condition of the over-production condition of the CO is satisfied, while it switches into the determination of the satisfaction of the condition of the over-production with respect to each of HC, $NO_x$, and $NH_3$ S53 by the EMS 20 when the condition of the over-production condition of the CO is not satisfied.

Further, the EMS 20 applies, in the S53, the catalyst temperature and the cooling water temperature as a HC factor; the LNT front end temperature, the DPF regeneration, and the EGR Duty as a $NO_x$ factor; and the SCR front end temperature as a $NH_3$ factor, respectively; and performs determination of the catalyst temperature S531; determination of the cooling water temperature S532; determination of the LNT front end temperature S534, determination of the DPF regeneration S535, and determination of the EGR Duty S536; and determination of the SCR front end temperature S538, respectively. Accordingly, the determination of the entry condition of the HC factor, the NOx factor, and the NH3 factor, respectively, is set as the following equation.

Equation of the entry condition of the HC factor

Catalyst temperature condition: catalyst temperature<$c$, cooling water temperature condition: cooling water temperature<$d$ Equation of the entry condition of the NOx factor LNT front end temperature condition: LNT front end temperature<$e$ DPF regeneration condition: DPF regeneration=ON (regeneration operation)

EGR Duty condition: EGR Duty=$f$

Equation of the entry condition of the NH3 factor

SCR front end temperature condition: SCR front end temperature≥$g$

Herein, the "catalyst temperature" indicates an entry-detected temperature of the catalyst 5; the "c" applies about 150° C. as an entry-predetermined catalyst temperature; the "cooling water temperature" indicates an entry-detected engine cooling water temperature of the engine 2; the "d" applies about 70° C. as a predetermined engine cooling water temperature; the "LNT front end temperature" indicates an entry-detected temperature of LNT 6-1; the "e" applies about 160° C. as an entry-predetermined temperature of LNT 6-1; and the "DPF regeneration" applies, as "during regeneration," an ON signal as an operation status of DPF 6-2; the "EGR Duty indicates an entry-detected EGR Duty of the EGR 3; the "f" applies 0% as an entry-predetermined EGR Duty; the "SCR front end temperature" indicates an entry-detected SCR front end temperature of SCR 6-3; and the "e" applies about 300° C. as an entry-predetermined temperature.

As a result, the EMS 20 determines as the satisfaction of the condition of the over-production of HC such as S533 when the entry-detected catalyst temperature is less than 150° C. or the entry-detected cooling water temperature is less than 70° C.; determines as the satisfaction of the condition of the over-production of NOx such as S537 when the entry-detected LNT front end temperature is less than 160° C., the DPF regeneration is in operation, or the EGR Duty is 0%; and determines as the satisfaction of the condition of the over-production of NH$_3$ such as S539 when the entry-detected SCR front end temperature is more than 300° C. Next, the EMS 20 enters into the opening of the exterior air door against others S53-1 controlled by the air conditioning controller 30 with respect to each of the conditions of the over-production of HC, NO$_x$, and NH$_3$. On the other hand, the EMS 20 feedbacks to the S10 with respect to each of the satisfaction of the condition of the over-production of CO, the satisfaction of the condition of the over-production of HC, the satisfaction of the condition of the over-production of NOx and the non-satisfaction of the condition of the over-production of NH3 and repeats the same step by the EMS 20.

Then, the air conditioning controller 30 is associated with the EMS 20; enters into the opening of the exterior air door against Co S52-1 or the opening of the exterior air door against others S53-1; and controls the door such as S54. For one example, the door control applies the following equation with respect to the door opening area.

Equation of the door control

Opening area of the door=$D_{open\_area}$ %

Herein, the "opening area of the door" indicates a detected opening area of the door in the door 7-1; the $D_{open\_area}$ applies about 3% of 100% of an opening area of the door 7-1 as a predetermined opening area of the door.

Referring to FIG. 3, the EMS 20 transmits an instruction of the introduction of the exterior air to the air conditioning controller 30 by a CAN signal and makes the air conditioning controller 30 as an operation status; and the air conditioning controller 30 matches an output value of the door DUTY identical to the instruction of the introduction of the exterior air in the natural ventilation map 30-1 and outputs to the door 7-1 of the air conditioning system 7. Then, the air conditioning controller 30 controls an opening operation of the door 7-1 such as the S54-1 until the door 7-1 reaches a 3% being the predetermined opening area of the door in the S54.

As a result, the interior space 1-1 of the vehicle 1 does not form an interior negative pressure by a mixture of an exterior air and thus CO, HC, NO$_x$, and NH$_3$ may be not introduced under a driving condition of the vehicle 1 that overly produces CO, HC, NO$_x$, and NH$_3$, thus not threatening a passenger safety.

Then, the normal gas mode of the controller 10 comprises determining a cancellation condition of blocking of the harmful gas S60; determining a vehicle speed under threshold S61; determining satisfaction of the cancellation condition of the over-production of CO S62 followed by a time delay S62-1; determining satisfaction of the cancellation condition of the over-production with respect to each of HC, NO$_x$, and NH$_3$ S63; and closing the door S64; and the internal air mode blocking a mixture of an exterior air is maintained from the normal gas mode without worrying formation of the internal negative pressure in a vehicle driving.

Particularly, the controller 10 divides into CO and HC, NO$_x$, NH$_3$ and performs the blocking of the exterior air together, and thus if considering only the CO as needed, may simplify the determination of the cancellation condition of the blocking of the harmful gas S60 into the S61, the S62, the S62-1, and the S64. The possibility of changing the logic serves convenience that makes the production amount of the harmful gas easily reflected according to a vehicle model.

Referring to FIG. 3, in the S61, the EMS 20 determines whether or not the driving of the vehicle 1 is a condition not to form an internal negative pressure in the interior space 1-1. As one example, the condition not to form the interior negative pressure applies a vehicle speed defined as a vehicle speed below threshold and is set as the following equation.

Cancellation condition of the interior negative pressure: vehicle speed<$V_{stop}$Kph Herein, the "vehicle speed" indicates a vehicle speed below threshold which is detected according to the driving of the vehicle 1; the "$V_{stop}$" applies about 110 Kph considering an aerodynamic aspect as a vehicle speed not to form the interior negative pressure, but it is possible to apply a predetermined value considering a specification of the vehicle 1 and density of the interior space 1-1 together. The "<" indicates a sign of inequality representing magnitudes of two values; and the "vehicle speed<$V_{stop}$" means that the detected vehicle speed is less than the predetermined vehicle speed $V_{stop}$.

As a result, the EMS 20 switches into the closing of the door S64 controlled by the air conditioning controller 30 when the detected vehicle speed below threshold of the driving vehicle 1 is less than 110 Kph ($V_{stop}$).

The closing of the door S64 immediately switches the door 7-1 to OFF by the air conditioning controller 30, which receives a closing instruction of the door according to a signal of the satisfaction of the cancellation condition of the over-production of CO in the EMS 20 by the CAN signal, thus stopping a mixture of an exterior air with respect to the interior space 1-1.

On the other hand, the EMS 20 goes to the determining the satisfaction of the cancellation condition of the over-production of CO S62 when the detected vehicle speed below threshold of the driving vehicle 1 is greater than 110 Kph ($V_{stop}$).

Figure 5:
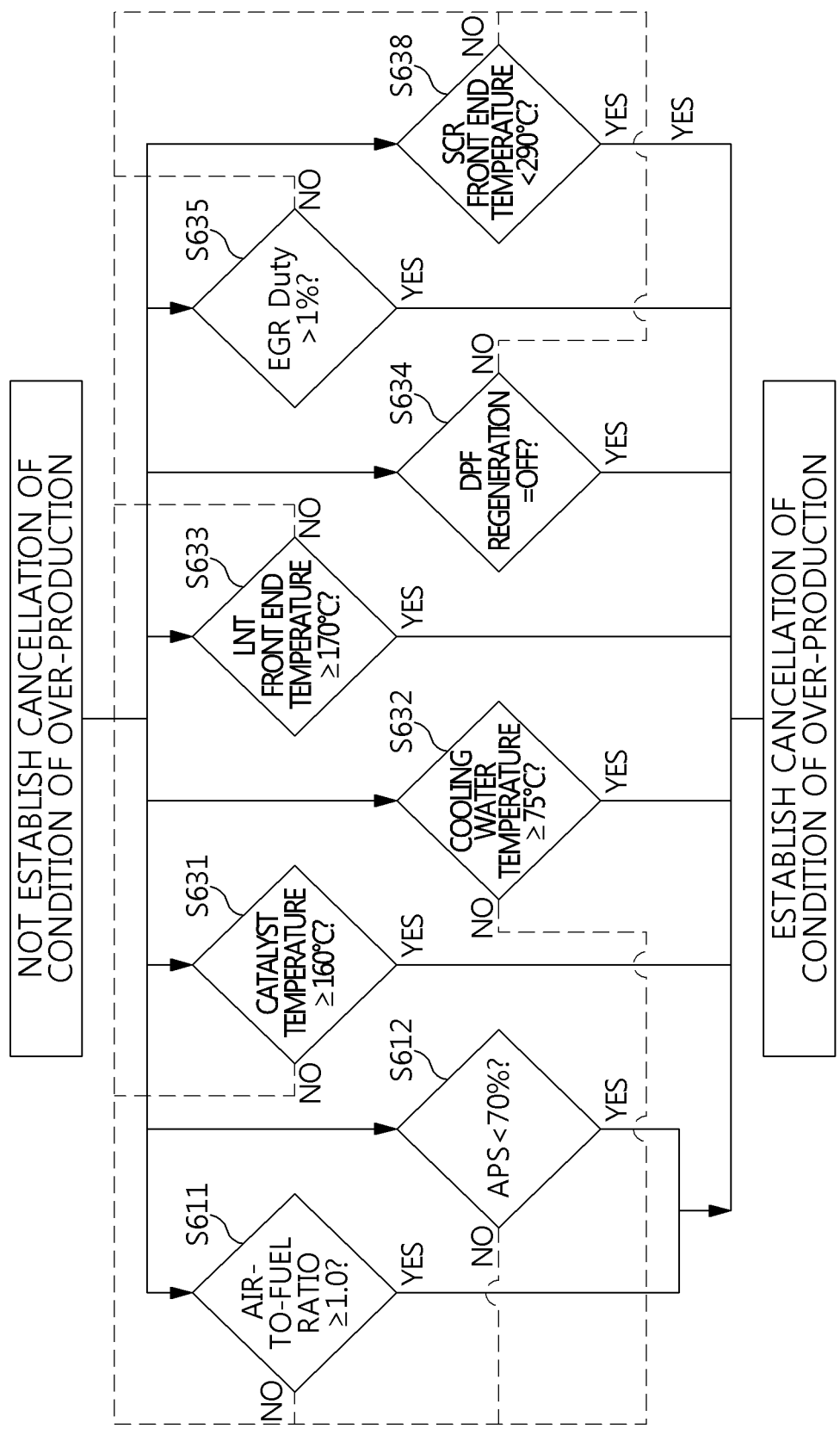
FIG. 5 is a view illustrating a logic of determining a cancellation condition for blocking of a harmful gas according to an exemplary embodiment of the present disclosure.

Referring to FIG. 5, the EMS 20 applies an air-to-fuel ratio and an APS as the CO factor in the S62 and performs the determination of the air-to-fuel ratio S611 and the determination of the APS S612, respectively. Accordingly, the determination of the cancellation condition of the CO factor is set as the following equation.

Equation of the cancellation condition of the CO factor

Air-to-fuel ratio condition: air-to-fuel ratio *aa*, APS condition: APS<*bb* %

Herein, the "air-to-fuel ratio" indicates a detected air-to-fuel ratio; the "aa" applies 1.0 as a predetermined air-to-fuel ratio; the "APS" indicates a detected depression of the acceleration pedal; and the "bb" applies about 70% as a predetermined APS.

As a result, the EMS 20 determines the satisfaction of the cancellation condition of the over-production of CO when the air-to-fuel ratio is more than 1.0 or the APS is less than 70% and then switches into the closing of the door S64 after the time delay S62-1 controlled by the air conditioning controller 30.

In the time delay S62-1, the following equation using a timer is applied.

Timer operation condition

Time delay=$T_{delay}$ sec

Herein, the "time delay" indicates the number of a measuring timer; the "$T_{delay}$" applies about 5 second as the predetermined number of a timer, but it is possible to apply a predetermined value considering the specification of the vehicle 1 and density of the interior space 1-1 together.

As a result, the air conditioning controller 30 maintains a door-opened status for 5 second at the time that receives the closing instruction of the door by a CAN signal according to a signal of the satisfaction of the cancellation condition of the over-production of CO in the EMS 20.

The closing of the door S64 switches the door 7-1 into OFF by the air conditioning controller 30 at the time reaching 5 second and stops a mixture of an exterior air with respect to the interior space 1-1.

Further, the EMS 20 applies, in the S63, the catalyst temperature and the cooling water temperature as a HC factor; the LNT front end temperature, the DPF regeneration, and EGR Duty as a NOx factor; and the SCR front end temperature as a NH3 factor, respectively; determines a cancellation condition with respect to each of them and feedbacks to the S61 while maintaining the opening of the door such as the S63-1 when the cancellation condition is not satisfied; and continues to determine a vehicle speed condition.

Referring to FIG. 5, in the EMS 20, the cancellation condition of the HC factor applies the determining the catalyst temperature S631, the determination of the cooling water temperature S632, and the cancellation condition of the NO, factor applies the determination of the LNT front end temperature S634, the determination of the DPF regeneration S635, and the determination of the EGR Duty S636; and the cancellation condition of the $NH_3$ factor applies the determination of the SCR front end temperature S638, respectively. Accordingly, the cancellation conditions of the HC factor, the $NO_x$ factor, and the $NH_3$ factor are set as the following equation, respectively.

Equation of the cancellation condition of the HC factor

Catalyst temperature condition: catalyst temperature≥*cc*, cooling water temperature condition: cooling water temperature≥*dd*

Equation of the entry determination of the NOx factor

LNT front end temperature condition: LNT front end temperature≥*ee*

DPF regeneration condition: DPF regeneration=OFF (regeneration stop)

EGR Duty condition: EGR Duty=*ff*

Equation of the entry determination of the NH3 factor

SCR front end temperature condition: SCR front end temperature≥*gg*

Herein, the "catalyst temperature" indicates a cancellation-detected temperature of the catalyst 5; the "cc" applies about 160° C. as a cancellation-predetermined catalyst temperature; the "cooling water temperature" indicates a cancellation-detected engine cooling water temperature of the engine 2; the "dd" applies about 75° C. as a cancellation-predetermined engine cooling water temperature; the "LNT front end temperature" indicates a cancellation-detected temperature of the LNT 6-1; the "e" applies about 170° C. as a cancellation-predetermined temperature of the LNT 6-1; the "DPF regeneration" applies, as regeneration stop, an OFF signal as an operation status of the DPF 6-2; the "EGR Duty" indicates a cancellation-detected EGR Duty of the EGR 3; the "ff" applies 1% as a cancellation-predetermined EGR Duty; the "SCR front end temperature" indicates a cancellation-detected SCR front end temperature of the SCR 6-3; and the "gg" applies about 290° C. as a cancellation-predetermined temperature.

As a result, the EMS 20 determines as satisfaction of the cancellation condition of the over-production of HC when the cancellation-catalyst temperature is more than 160° C. or the cancellation-cooling water temperature is more than 70° C.; determines as satisfaction of the cancellation condition of the over-production of NOx when the cancellation-LNT front end temperature is more than 170° C., the DPF regeneration is in a stop status, or the cancellation-EGR Duty is 1%; and determines as satisfaction of the cancellation condition of the over-production of NH3 such as the S539 when the cancellation-SCR front end temperature is less than 290° C. Next, the EMS 20 switches to the closing of the door S64 controlled by the air conditioning controller 30 with respect to each of the cancellation conditions of the over-production of HC, NOx, and NH3.

The closing of the door S64 immediately switches the door 7-1 to OFF by the air conditioning controller 30, which receives a closing instruction of the door according to the signal of the satisfaction of the cancellation condition of the over-production of CO in the EMS 20 by the CAN signal, thus stopping a mixture of the exterior air with respect to the interior space 1-1.

Then, the controller 10 continuously performs the logic of the natural ventilation of the vehicle interior until the engine stops S70, and is reset as an initial status when the engine stops.

Figure 6:
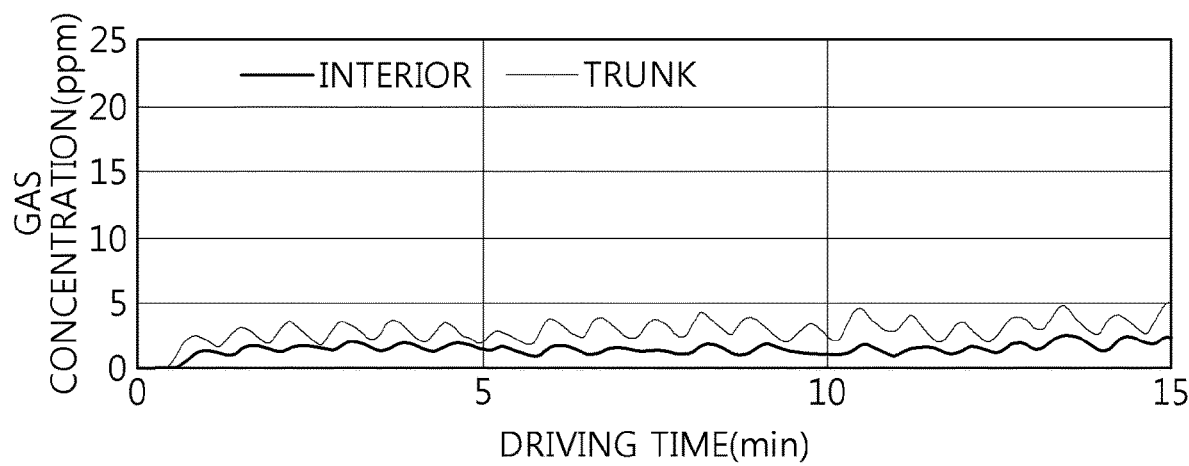
FIG. 6 is a diagram illustrating a measurement of the exhaust gas in the vehicle interior performing the method for the conditional, vehicle speed sensitive natural ventilation of the vehicle interior according to an exemplary embodiment of the present disclosure.

Meanwhile, FIG. 6 is a diagram illustrating the measured exhaust gas of the interior space 1-1 and the trunk room 1-2 when the door 7-1 of the air conditioning system 7 opens a 3% when the 4-door vehicle 1 is driving at a high speed of 120 Kph; an air-to-fuel ratio is less than 1.0 or an APS is more than 80%; or a catalyst temperature is less than 150° C. and a cooling water temperature is less than 70° C.; or an LNT front end temperature is less than 160° C., DPF regeneration is in operation, or an EGR Duty is 0%; or a SCR front end temperature is more than 300° C.

As shown, it is experimentally proved that although the vehicle 1 is driving in the conditions of the over-production of CO, HC, $NO_x$, and $NH_3$, concentrations of CO, HC, $NO_x$, and $NH_3$ of the interior space 1-1 and the trunk room 1-2 are maintained to be less than about 5 ppm.

As described the above, the method for natural ventilation of the vehicle interior of the vehicle according to the present disclosure introduces an exterior air into the interior space 1-1 in an internal air mode and blocks the formation of the interior negative pressure if the controller 10, which confirms the internal air mode of the air conditioning system 7, determines a driving speed of the vehicle 1 reaching 120 Kph as a condition of forming the interior negative pressure in the interior space 1-1 and then confirms the condition of the over-production of the harmful gas in the exhaust gas, thus preventing the overly produced harmful gas from being introduced from the trunk room 1-2 into the interior space 1-1; and if the driving speed of the vehicle 1 is reduced to 110 Kph or the condition of the over-production of the harmful gas is not confirmed, the introduction of the exterior air into the interior space 1-1 is stopped. As a result, even when driving at a high speed of about 120 Kph, the vehicle 1 restrains the interior introduction of CO, HC, $NO_x$, $NH_3$, and $H_2S$ effectively, and also resolves side effects due to the frequent introduction of the exterior air, thus enhancing a passenger safety, resolving client's dissatisfaction, enhancing an interior comfort, and improving an air-to-fuel ratio; and particularly, it is possible to reduce or remove a component additionally applied, thus enhancing cost savings as well.

What is claimed is:

1. A method for natural ventilation of a vehicle interior, comprising steps of:
    determining, by a controller, formation of an interior negative pressure in an interior space while driving of a vehicle is maintained as an internal air mode,
    determining, by the controller, an over-production of a harmful gas in an exhaust gas using an air-to-fuel ratio or an Accelerator Position Scope (APS), when an air conditioning system is in operation;
    mixing an exterior air into the interior space so as to mitigate the interior negative pressure in the internal air mode; and
    after mixing the exterior air, determining an elimination of the over-production of the harmful gas and blocking the exterior air,
    wherein before the step of determining the formation of the interior negative pressure and the determination of the over-production of the harmful gas in the exhaust gas, checking a Throttle Position Scope (TPS) and a vehicle speed together with an air-to-fuel ratio, an Accelerator Position Scope (APS), a catalyst temperature, a cooling water temperature, an LNT front end temperature, a DPF regeneration, an EGR Duty, and a SCR front end temperature using an emission data of the exhaust gas; and determining whether an operation status of the air conditioning system is in the internal air mode.

2. The method for natural ventilation of the vehicle interior of claim 1, wherein the exterior air is introduced into a door of the air conditioning system.

3. The method for natural ventilation of the vehicle interior of claim 2, wherein the door opens only a partial area of total opening area.

4. The method for natural ventilation of the vehicle interior of claim 1, wherein the step of determining the formation of the interior negative pressure regards the vehicle speed as a condition of forming the interior negative pressure.

5. The method for natural ventilation of the vehicle interior of claim 4, wherein the vehicle speed is classified into the condition of forming the interior negative pressure, and
    the vehicle speed upon forming the interior negative pressure is set to be higher than upon not forming the interior negative pressure.

6. The method for natural ventilation of the vehicle interior of claim 1, wherein the harmful gas is CO.

7. The method for natural ventilation of the vehicle interior of claim 6, wherein the air-to-fuel ratio and the APS are classified into the condition of the over-production of the harmful gas,
    the air-to-fuel ratio upon the over-production of the harmful gas is set to be lower than upon the elimination of the over-production of the harmful gas, and
    the APS upon the over-production of the harmful gas is set to be higher than upon the elimination of the over-production of the harmful gas.

8. The method for natural ventilation of the vehicle interior of claim 6, wherein the blocking of the exterior air is time-delayed after the elimination of the over-production of the harmful gas.

9. The method for natural ventilation of the vehicle interior of claim 8, wherein the time delay is a timer count.

10. The method for natural ventilation of the vehicle interior of claim 1, wherein a condition of the over-production of the harmful gas further comprises any one of a catalyst temperature, a cooling water temperature, an Lean NOx Trap (LNT) front end temperature, a Diesel Particulate Filter (DPF) regeneration, an Exhaust Gas Recirculation (EGR) Duty, and a Selective Catalytic Reduction (SCR) front end temperature, and
    the catalyst temperature or the cooling water temperature regards HC as an overly produced harmful gas, the LNT front end temperature or the DPF regeneration or the EGR Duty regards NOx as the overly produced harmful gas, and the SCR front end temperature regards NH3 as the overly produced harmful gas.

11. The method for natural ventilation of the vehicle interior of claim 10, wherein the catalyst temperature and the cooling water temperature are classified into the condition of the over-production of the harmful gas,
    the catalyst temperature upon the over-production of the harmful gas is set to be lower than upon the elimination of the over-production of the harmful gas; and the cooling water temperature upon the over-production of the harmful gas is set to be lower than upon the elimination of the over-production of the harmful gas, and the blocking of the exterior air performs without a time delay after the elimination of the over-production of the harmful gas.

12. The method for natural ventilation of the vehicle interior of claim 10, wherein the LNT front end temperature, the DPF regeneration, and the EGR Duty are classified into the condition of the over-production of the harmful gas,
   the LNT front end temperature upon the over-production of the harmful gas is set to be lower than upon the elimination of the over-production of the harmful gas; the DPF regeneration upon the over-production of the harmful gas is set to be in operation while it is set to be stopped upon the elimination of the over-production of the harmful gas; and the EGR Duty upon the over-production of the harmful gas is set to be lower than upon the elimination of the over-production of the harmful gas, and
   the blocking of the exterior air performs without a time delay after the elimination of the over-production of the harmful gas.

13. The method for natural ventilation of the vehicle interior of claim 12, wherein the EGR Duty regards 0% as the satisfaction.

14. The method for natural ventilation of the vehicle interior of claim 10, wherein the SCR front end temperature is classified into the condition of the over-production of the harmful gas,
   the SCR front end temperature upon the over-production of the harmful gas is set to be higher than upon the elimination of the over-production of the harmful gas; and
   the blocking of the exterior air performs without a time delay after the elimination of the over-production of the harmful gas.

15. The method for natural ventilation of the vehicle interior of claim 1, wherein the air-to-fuel ratio, the APS, the catalyst temperature, the cooling water temperature, the LNT front end temperature, the DPF regeneration, the EGR Duty, and the SCR front end temperature are classified into a production factor of the harmful gas.

16. A vehicle, comprising:
   a controller configured to perform the steps of the method of claim 1;
   an air conditioning system configured to operate in an internal air mode or an exterior air mode and configured to introduce the exterior air into the interior space by opening of a door; and
   an exhaust line flowing the exhaust gas generated in an engine with an Exhaust Gas Recirculation (EGR) gas supplied by the EGR and comprising a catalyst removing the harmful gas and a post-processing device,
   wherein the controller is further configured to introduce the exterior air into the interior space in a condition of the formation of an interior negative pressure and a condition of the over-production of the harmful gas in the exhaust gas, and to mitigate the condition of the formation of the interior negative pressure.

17. The vehicle of claim 16, wherein the door introduces the exterior air by a 3% of total opening area.

18. The vehicle of claim 16, wherein the catalyst is a Warm Up Catalytic Converter (WCC) or an Under floor Catalytic Converter (UCC) and the post-processing device is configured as an Lean NOx Trap (LNT), a Diesel Particulate Filter (DPF), or a Selective Catalytic Reduction (SCR).

\* \* \* \* \*